June 14, 1960 F. F. EHRENHAFT ET AL 2,940,372
ANAMORPHIC ADAPTER ARRANGEMENT
Filed July 15, 1957 4 Sheets-Sheet 1
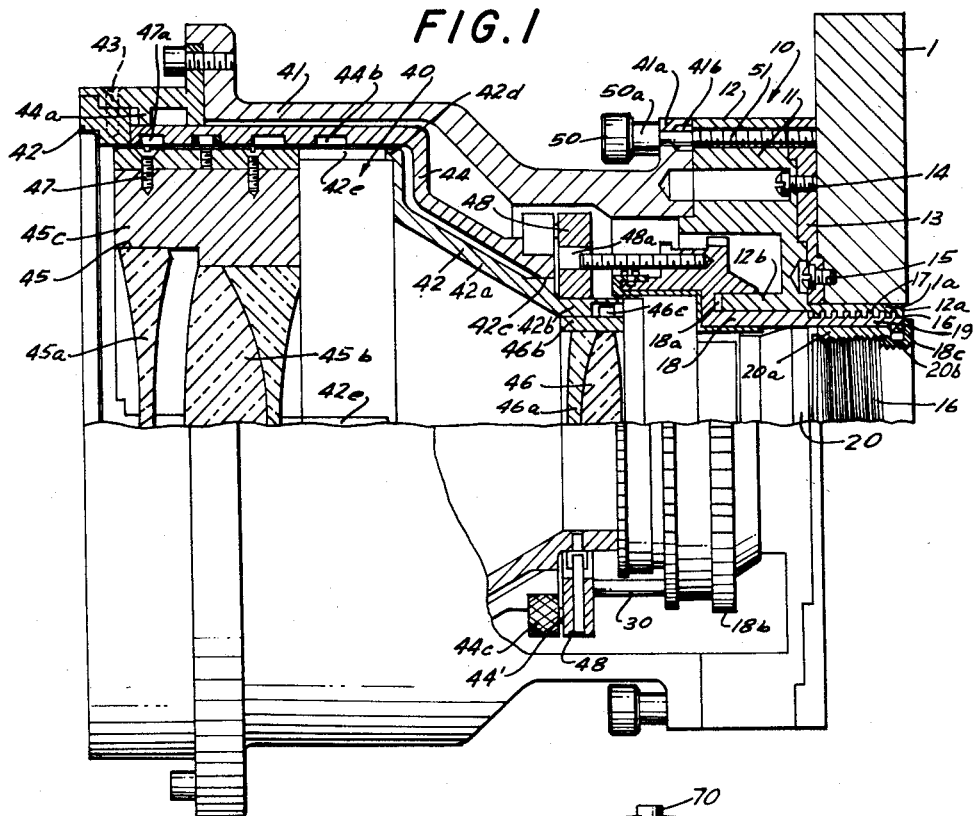
FIG. 1
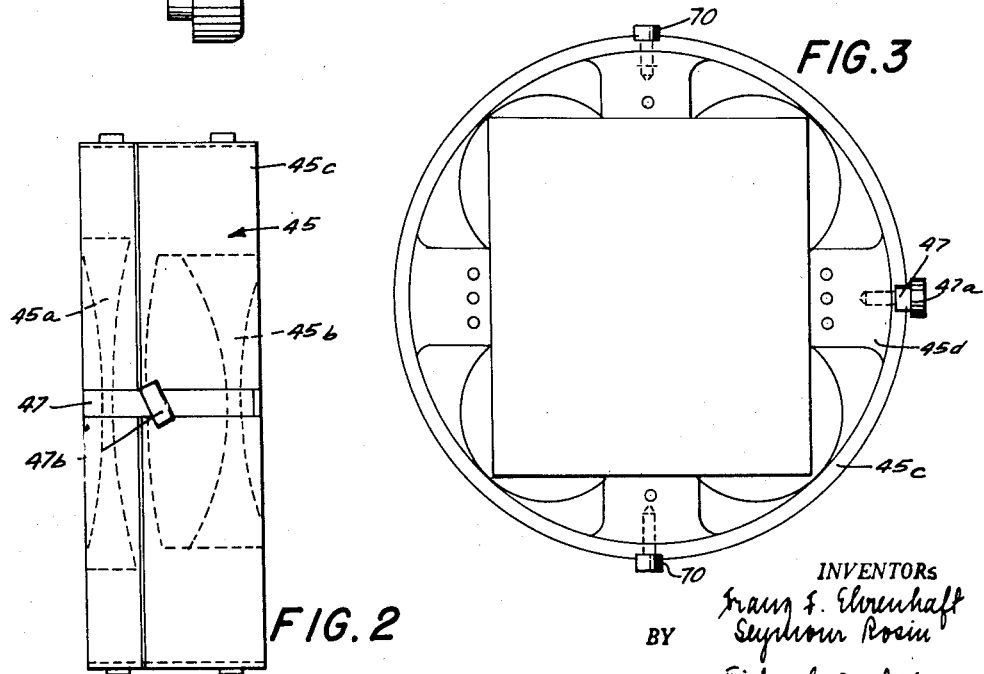
FIG. 2
FIG. 3
INVENTORs
Franz F. Ehrenhaft
Seymour Rosin
BY
Michael S. Striker

FIG. 5

| | FOCAL LENGTH | THD/IN. | LEAD | SUBJECT DISTANCE | ∞ | 25' | 6' | 3½' |
|---|---|---|---|---|---|---|---|---|
| | | | | TURNING ANGLE | 0 | 42° | 175° | 300° |
| OBJECTIVE I | 40 MM | 14.06 | .071 | AXIAL DISPLACEMENT | 0 | .008 | .034 | .059 |
| OBJECTIVE II | 50 MM | 9.00 | .111 | AXIAL DISPLACEMENT | 0 | .013 | .054 | .092 |
| OBJECTIVE III | 75 MM | 4.00 | .250 | AXIAL DISPLACEMENT | 0 | .029 | .122 | .209 |
| OBJECTIVE IV | 100 MM | 2.25 | .444 | AXIAL DISPLACEMENT | 0 | .052 | .216 | .370 |
| ANAMORPHIC TELESCOPE | — | 1.50 | .667 | AXIAL DISPLACEMENT | 0 | .078 | .324 | .556 |

FIG. 5a

| | FOCAL LENGTH | THD/IN. | LEAD | | SUBJECT DISTANCE | ∞ | 25' | 6' | 24.8" |
|---|---|---|---|---|---|---|---|---|---|
| | | | | TURNING ANGLE | | 0 | 21.53° | 124° | 360° |
| OBJECTIVE I | 20 MM | 40.00 | .025" .63 MM | AXIAL DISPLACEMENT | | 0 | .0015 | .0086 | .025 |
| OBJECTIVE II | 25 MM | 25.60 | .039" 1.0 MM | AXIAL DISPLACEMENT | | 0 | .0023 | .0134 | .039 |
| OBJECTIVE III | 40 MM | 10.00 | .100" 2.5 MM | AXIAL DISPLACEMENT | | 0 | .0060 | .0344 | .100 |
| OBJECTIVE IV | 50 MM | 6.40 | .156" 4.0 MM | AXIAL DISPLACEMENT | | 0 | .0093 | .0538 | .156 |
| OBJECTIVE V | 75 MM | 2.84 | .352" 9.0 MM | AXIAL DISPLACEMENT | | 0 | .021 | .121 | .352 |
| ANAMORPHIC TELESCOPE | — | 3.00 | .333 8.5 MM | AXIAL DISPLACEMENT | | 0 | .020 | .115 | .333 |

United States Patent Office 2,940,372
Patented June 14, 1960

2,940,372

ANAMORPHIC ADAPTER ARRANGEMENT

Franz F. Ehrenhaft, Forest Hills, and Seymour Rosin, Massepequa Park, N.Y., assignors to Scanoptic, Inc., New York, N.Y.

Filed July 15, 1957, Ser. No. 671,778

12 Claims. (Cl. 95—45)

The present invention relates to an anamorphic adapter arrangement, and more particularly to anamorphic adapter arrangement which permits the use of a single anamorphic adapter with a plurality of camera objectives of different focal lengths.

A standard lens as used in present motion pictures has its image framed at the focal plane in the camera into an approximately four by three format. If an anamorphic lens system is placed in front of the camera lens, the image at the focal plane has a four by three format as before, but originates from a scene with eight by three boundaries, if the anamorphic lens had, for example, a 2 to 1 ratio.

When the subject distance varies, it is not only necessary to focus the camera objective, but also necessary to focus the anamorphic lens system by shifting at least one of the lenses of the anamorphic system relative to the other lenses of the anamorphic system.

Therefore, two different settings are necessary, one for the anamorphic lens and one for the camera lens. It is almost impossible to set both lens groups properly, while it is desirable to make both focussing settings simultaneously with one common control.

The position of the two groups of lenses in the anamorphic system changes relative to each other between infinity and a predetermined close position. This change is always the same for certain subject distances, and independent of the focal length of the camera lens which is used in connection with the anamorphic system.

It is possible to design the mounts of the anamorphic lens system and of the associated camera objective in such a manner that turning of the two mounts through the same angle will simultaneously focus the anamorphic lens system and the camera objective to different subject distances.

However, it is necessary to use camera objectives of different focal length in order to cover a larger or smaller area from the same camera position. Turrets supporting a plurality of camera objective systems are generally used for this purpose, or the camera is so designed that the camera objective systems can be exchanged. In accordance with the known art, it is necessary to incorporate an anamorphic lens system in each camera objective system. This is due to the fact, that the known camera objective systems of different focal length require turning of the respective control means through different angles for focusing the respective camera objective for the same subject distance. Consequently, an anamorphic adapter requiring turning of its control means through a certain angle for being focused for a certain subject distance is only capable of being connected to a camera objective system requiring turning through the same angle for being focused to the same subject distance.

Therefore, it is necessary to provide, for example, three anamorphic lens systems if three camera objective systems are provided for a camera.

It is one object of the present invention to overcome this disadvantage of the prior art, and to provide an anamorphic adapter arrangement in which a single anamorphic adapter can be used with a plurality of camera objective systems.

It is another object of the present invention to provide an anamorphic adapter arrangement which reduces the cost of an anamorphic television camera arrangement.

It is another object of the present invention to provide an anamorphic adapter arrangement in which a single anamorphic adapter can be selectively coupled with a plurality of camera objectives of different focal length while simultaneous focusing of the anamorphic adapter and of any one of the camera objectives by a common control member is possible.

The camera objective systems according to the present invention each include a support, a control means turnably mounted on the support, an objective movable in axial direction thereof, and transmission means driven from the control means for moving the objective in axial direction. The objectives of the different camera objective systems have different focal lengths, and the transmission means have different ratios which are respectively related to the focal length of the respective objective. The arrangement is such that turning of the control means of any camera objective system through the same angle will focus the respective objective for the same subject distance, which, of course, requires moving of the respective objectives for different axial distances corresponding to the respective focal lengths of the objectives.

Although the objectives of the different camera objective systems have different focal lengths, the respective control means have to be turned the same angle if the same subject is to be focused.

In accordance with the present invention, each of the control means of the several camera objective systems can be coupled to the control means of the anamorphic adapter. The anamorphic adapter is so constructed that it is focused to a selected subject distance by turning its control means through the angle through which each of the control means of the different camera objective systems have to be turned for focusing the respective camera objective to the same subject distance.

It is therefore also an object of the present invention to provide a plurality of camera objectives of different focal lengths with control means which have to be turned through tne same angle for focusing any one of the camera objectives to the same subject distance.

With these objects in view, the present invention mainly consists in an arrangement which comprises a plurality of camera objective systems, each camera objective system including a support, a control means turnably mounted on the support, an objective movable in axial direction, the objectives having different focal lengths, and transmission means driven from the control means for moving the objectives in axial direction for focusing the same, the transmission means of the cemera objective systems having different ratios respectively related to the focal length of the respective objective for moving the objective of each camera objective system a different axial distance for focusing each objective for the same subject distance when said control means is turned through the same angle; anchor support detachably attached to the support of one of the camera objective systems and adapted to be attached to the support of any one of the camera objective systems; and an operating means turnable through a plurality of selected angles associated with different subject distances and being detachably coupled to the control means of one of the camera objective systems. The operating means is adapted to be coupled to the control means of any one of the camera objective systems for turning the same through the selected angles for effecting focusing of the respective objective to the different subject distances. In the preferred embodiment of the present invention, the operating means is the control means of an anamorphic adapter which is simultaneously focused to the above-mentioned different subject distances. Attaching means are provided for detachably attaching the support of the anamorphic adapter to the supports of the camera objective systems in a position in which the anamorphic lens system is optically aligned with the respective objective. Coupling means detachably couple the control means of the anamorphic adapter to the control means of a selected camera objective system so that the anamorphic lens system and the respective camera objective are simultaneously focused for selected subject distances.

In one embodiment of the present invention, the control means of the camera objective systems directly support the objective so that the camera objective turns when the camera is focused. In this embodiment, coupling pins are secured to the control means of the camera objective systems and slidably engage corresponding openings in the control means of the anamorphic adapter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side view, partly in section, of an embodiment of the present invention;

Fig. 2 is a side view of a detail;

Fig. 3 is a front view of the detail shown in Fig. 2;

Figs. 5 and 5a are tables showing constructive data of practical embodiments of the present invention.

Figure 4:
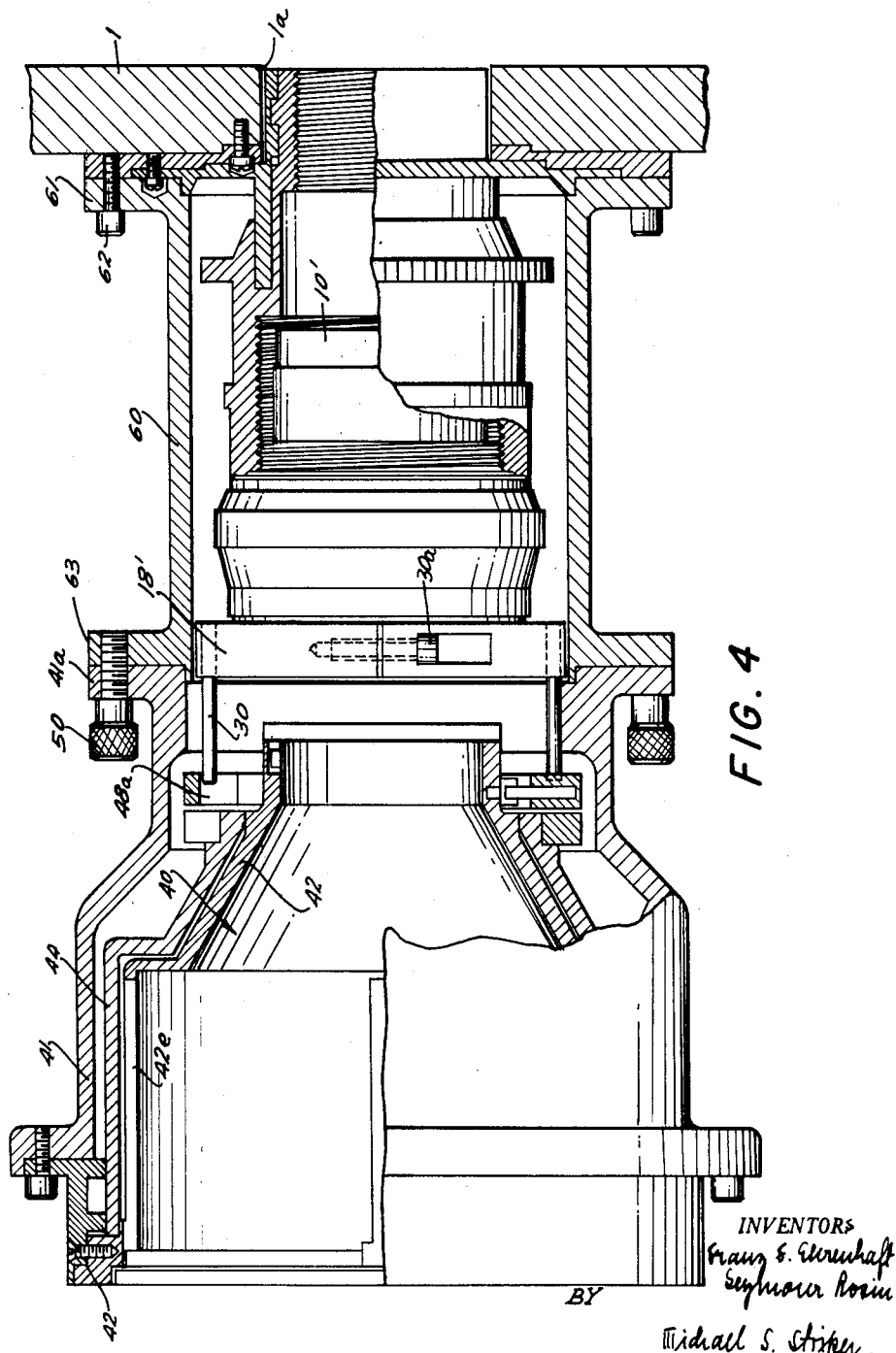
Fig. 4 is a side view, partly in section, of the embodiment shown in Fig. 1 in which the anamorphic adapter is attached to a different camera objective system.

Referring now to the drawings, and more particularly to Fig. 1, a camera objective system is mounted on a turret 1 in the seat 1a. Only one camera objective system and its seat 1a is shown in the drawing, but it will be understood that the current 1 has a plurality of seats, each seat receiving and holding a camera objective system. The illustrated camera objective system is generally indicated by the reference numeral 10 and includes a support 11 comprising parts 12 and 13 which are connected to each other by screws 14. Part 13 is attached to the turret 1 by screws 15. The support part 12 includes a cylindrical portion 12a which is seated in the seat 1a, and a circular guide portion 12b. A female thread means 16 is provided on the inner surface of the portion 12a, and is in threaded engagement with a male thread means 17 which is provided on a tubular portion 19 of control means 18. Control means 18 have a circular recess 18a which is in sliding engagement with the portion 12b of the support 11. The control means 18 has an outer gear 18b which either meshes with a drive pinion, not shown, or is manually operated through a slot in the support 10. In any event, turning of the control means 18 will effect an axial movement of the control means 18 due to the fact that the thread means 12a are fixed in the turret 1, whereas the thread means 17 are movable with the control means 18. A camera objective 20 is fixedly mounted within the control means 18 and is held in the same by members 20a and 20b which engage a flange 18c of the control means 18. Each of the camera objective systems 10, of which only one is shown, includes a thread means 15, 17 having a different lead, and consequently a different number of threads per inch. Consequently turning of the control means 18 through the same angle will result in axial movement of the respective objective 20 through a different axial distance.

In accordance with the present invention, the objectives 20 of the plurality of camera objective systems 10 have different focal lengths, and have thread means 15, 17 which are depending on the respective focal length of the respective objective.

In accordance with the present invention, turning of the control means 18 of each camera objective system 10 through the same angle will effect focusing of the respective objective for the same subject distance. Since the focal lengths of the objectives are different, each objective has to move through a different axial distance for being focused to the same subject distance. Such different axial movement for the same turning angle of the respective control means 18, is obtained by providing thread means 15, 17 of different lead for each camera objective system 10.

The table of Fig. 5 shows that three objectives having different focal lengths have to be displaced through different axial distances out of the infinity positions for being focused to the same subject distance. The turning angle of the respective control means, however, is the same for all three objectives for the same subject distance. In the preferred embodiment of the present invention, the maximum turning angle of the control means is 300°, and turning of any one control means through such angle will focus the respective objective 20 to the shortest desired subject distance. Fig. 5a shows another example.

A plurality of coupling pins 30 are fixedly secured to the control means 18 of each camera objective system 10. The coupling pins 30 serve the purpose of selectively coupling the control means 18 of each camera objective system 10 with an anamorphic adapter, generally indicated by the reference numeral 40. Only a single anamorphic adapter 40 is provided for selective cooperation with each of the camera objective systems 10.

The anamorphic adapter 40 includes a housing 41 of generally tubular shape with a reduced portion terminating in a flange 41a. A plurality of holes 41b are provided in flange 41a spaced from each other in circumferential direction. A support 42 is connected by screws 43 to the housing 41. The support 42 is of generally tubular shape with a frusto-conical portion 42a ending in a cylindrical portion 42b. Since the support 42 is fixedly connected to the housing 41, the housing and the support 42 together constitute a support for the control means 44 which is a generally tubular member turnably mounted in the annular space between the support 42 and the housing 41. One end of the control means 44 is turnably mounted on the surface 42c of the support 42, and the other end of the control means 44 has a flange 44a which prevents axial movement of the control means 44 relative to the support 42 and the housing 41. The cylindrical portion 42d of the support 42 has a plurality of axially extending slots 42e.

An anamorphic lens system including a front member 45, and a rear member 46 is mounted within the support 42. In the illustrated embodiment of the present invention, the rear member 46 includes a doublet 46a mounted in the cylindrical mount 46b which is provided with a pin 46c projecting into a slot of the portion 42c of the support 42. Adjusting screws, not shown, engage the pin 46c for exactly adjusting the position of the rear lens member 46 in a desired fixed position.

The front lens member 45 of the anamorphic lens system includes a singlet 45a, and a doublet 45b which are fixed in a common barrel-shaped lens mounting means 45c. The lens mounting means 45c is slidable along the inner surface of the portion 42d of the support 42.

As best seen in Figs. 2 and 3, the lens mounting means 45c has two diametrically arranged pairs of projections 70, which are the heads of screws attached to the lens mounting means 45c. A guide 47 is also secured to the lens mounting means 45c and has a guide portion 47a which is turntable on a pivot means 47b.

Referring again to Fig. 1, a pair of opposite slots 42e are provided for slidably guiding the projections 70 (not shown in Fig. 1). A slot 42e is arranged intermediate the first mentioned two slots 42e and slidably guides guide portion 47a (not shown in Fig. 1). The pivoted guide head 47a is located in a helical guide slot 44b in the inner surface of the tubular control means 44. The pivoted head portion 47a assumes a position corresponding to the pitch of the helical guide slot 44b and prevents binding of the guide pin 47.

It is evident that turning of the control means 44 will effect movement of the front lens member 45 of the anamorphic lens system since the guide slots 42e prevent a turning movement of the front lens member 45.

As best seen in Fig. 3, the lens mounting means 45c has four inner projections 45d which are adapted to hold the rectangular lenses of the anamorphic lens system.

Since in accordance with the present invention, the control means 44 has to turn together with the control means 18, it would be possible to provide a number of openings in the flange 44c, and to arrange the coupling pins 30 in such a manenr that they project into such holes. However, in the preferred embodiment of the present invention, a floating ring 48 is arranged on the portion 42c of the support 42 and provided with a number of openings 48a in which the coupling pins 30 are slidably guided. The floating ring 48 is connected to the control means 44 for rotation therewith but is slightly movable relative to the same in radial direction so that binding of the coupling pins 30 is prevented when the coupling pins 30 move in axial direction into the corresponding openings 48a. The flange 44c is preferably a ring clamped to control means 44 and carrying pins 44' projecting into radial slots in ring 48.

Since the control means 44 is connected to the control means 18 by the coupling means 30 and 48a, turning of the control means 18 will effect simultaneous turning of the control means 44 through the same angle.

The anamorphic adapter is secured to the support 12 of the camera objective system which is placed by the turret 1 in the operative position in which light passes through the anamorphic adapter and the objective 20 into the camera. Attaching means 50 are provided for attaching the anamorphic adapter to the camera objective system which is in operative position, and are shown to be nut means 50a in threaded engagement with threaded bolts 51 which pass through openings 41b in the flange 41a of the housing 41. The position of the first support 41, 42 associated with the anamorphic adapter, and of the second support 11 of the respective camera objective system 10 is such that the coupling pins 30 project into the openings 48a when the objective 20 is in infinity position, and the front lens member 45 is spaced from the rear lens member 46 such a distance that the anamorphic lens system 45, 46 is also in infinity position. In this position, the camera is focused at infinity.

In accordance with the present invention, not only the leads of the thread means 15, 17 of the camera objective systems are interrelated, but also the leads of all thread means 15, 17 are interrelated with the lead of the helical guide means 44b. The relation is such that when any one of the objectives 20 is focused at a selected subject distance by turning control means 18 through a certain angle, the anamorphic lens system 45, 46 is also focused at the same subject distance by moving the front lens member 45 a certain predetermined distance with respect to the fixed rear lens member 46.

Whenever the anamorphic lens system is focused to a selected different subject distance, the respective coupled camera objective system 10 is focused to the same subject distance. Moreover, since in accordance with the present invention the control means of any one of the plurality of camera objective system has to be turned to the same angle for focusing the respective camera objective to the same subject distance, it is possible to couple the control means 18 of any one of the camera objective systems 10 to the control means 44 of the anamorphic adapter, and turning of the control means 44 of the anamorphic adapter will effect automatic focusing of any one of the objectives 20 to the subject distance to which the anamorphic adapter is focused.

Referring again to the table of Fig. 5, the last line of the table shows that the turning of the control means of the anamorphic adapter together with the control means of the camera objective system through a series of selected different angles will result in such axial displacement of the movable anamorphic lens member that the anamorphic lens system is focused to the same subject distance as the respective camera objective.

During the turning of the control means 18, the control means 18 moves in axial direction so that the coupling pins 30 slide in axial direction in the openings 48a.

Referring now to Fig. 4, another camera objective system 10' which is mounted in another opening 1a is shown in operative position with the anamorphic adapter 40 attached thereto. The objective of the camera objective system 10' may have a focal length of 100 mm., and the objective of the camera objective system 10 may have a focal length of 50 mm. Since in accordance with the present invention only a single anamorphic adapter is provided for all camera objective systems which are mounted in the turret 1, the camera objective system 10' will be without an anamorphic adapter when it is in inoperative position, while the adapter will be, for example, attached as shown in Fig. 1 and cooperates with the camera objective system having a focal length of 50 mm.

Due to the greater focal length of the respective objective, the camera objective system 10' is longer than the camera objective system 10, and consequently it is necessary to provide an adapter piece 60 having one flange 61 secured by screws 62 to the support of the camera objective system 10', and another flange 63 which is secured by attaching means 50 to the flange 41a of the housing 41 of the anamorphic adapter. The control means 18' carries coupling pin 30 which engage corresponding openings 48a in the control means 44 of the anamorphic adapter. An adjusting screw 30a is provided for exactly determining the position of the coupling pins 30.

If it is desired to use the anamorphic adapter with an objective having, for example, the focal length 50 mm., the turret 1 is turned until such objective is in operative position, and the housing of the anamorphic adapter is attached to the support 11 of the respective camera objective system 10 by the attaching means 50 in a position of the control means 44 and 18 in which the coupling pins 30 project into the openings 48a. When the control means 18 is turned through selected different angles, the anamorphic lens system and the camera objectives are simultaneously focused to selected subject distances. When it is desired to use a camera objective having a different focal length, the attaching means 50 are removed, the anamorphic adapter is detached from the support 11, and placed on the support 11 of another camera objective system mounted on the turret, for example the camera objective system 10' shown in Fig. 4. Thereupon the attaching means 50 are again secured when the coupling pins of the control means 18' project into the corresponding slot 48a. Turning of the control means through the same selected different angles as before will now again focus the camera objective of different focal length to the same series of subject distances. Therefore, it is possible to use a single anamorphic adapter with a set of camera objectives having different focal lengths.

It will be understood that the helical guide means together with the guide pin means 47a constitutes a first transmisison means for moving the lens mounting means 45c and the front lens member of the anamorphic lens system in axial direction when the control means 44 is turned. Each camera objective system 10 is provided with thread means 15 and 17 which constitute a second transmission means for effecting axial movement of the objective 20 when the control means 18 is turned. The ratios of such second transmission means 15, 17 depend on the focal length of the respective objective, and are so chosen that the objectives of all camera objective systems are focused for the same subject distances when the respective control means is turned through the same angle. The ratios of the first transmission means and of the second transmission means are again interrelated so that the anamorphic lens system is focused to the same subject distance as any coupled camera objective.

A preferred embodiment of the present invention has been described in which a plurality of camera objective systems are mounted on a turret and are successively placed in operative position by turning the turret on the camera. However, it is also possible to use a camera having a single seat in which the different camera objective systems can be placed as required, and in this event the anamorphic adapter is attached to the respective camera objective system which is attached to the camera. The advantages of the present invention are present as before since a single anamorphic adapter can be used with a plurality of camera objective systems having objectives of different focal lengths.

It will be understood that each of the elements described above, or two or more together, may also find a useful application in other types of apparatus employing a plurality of objectives having different focal lengths differing from the types described above.

While the invention has been illustrated and described as embodied in an anamorphic adapter arrangement in which a single anamorphic adapter can be used with a plurality of objectives having different focal lengths, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An anamorphic adapter arrangement comprising, in combination, an anamorphic adapter including a first support, a first control means turnably mounted on said first support, and an anamorphic lens system including a movable lens member connected to said first control means and operated by the same so that turning of said first control means through selected different angles effects focusing of said anamorphic lens system for selected different subject distances; a plurality of camera objective systems, each camera objective system including a second support, a second control means turnably mounted on said second support, an objective movable in axial direction thereof, the objectives of said camera objective systems having different focal lengths, and transmission means driven from said second control means for moving said objective in axial direction, the transmission means of said camera objective systems having different ratios respectively related to the focal length of the respective objective for moving the objective of each camera objective system a different axial distance when said second control means is turned through the same angle for effecting focusing of each of said objectives for said selected different subject distances when said second control means is turned through said selected different angles; attaching means for detachably attaching said first support to the second support of one of said camera objective systems in a position in which said anamorphic lens system is optically aligned with the respective objective, said attaching means being adapted to detachably attach said first support to the second support of each of said camera objective systems; and coupling means detachably coupling the second control means of said one camera objective system to said first control means for simultaneous turning through said selected different angles, and being adapted to couple the second control means of each of said camera objective systems with said first control means when the second support of the respective camera objective system is attached to said first support.

2. An anamorphic adapter arrangement comprising, in combination, an anamorphic adapter including a first support, a first control means turnably mounted on said first support, and an anamorphic lens system including a movable lens member connected to said first control means and operated by the same so that turning of said first control means through selected different angles effects focusing of said anamorphic lens system for selected different subject distances; a plurality of camera objective systems, each camera objective system including a second support, a second control means mounted on said second support for turning movement, an objective movable in axial direction thereof, the objectives of said camera objective systems having different focal length, first thread means fixedly secured to said objective and second thread means secured to said second support nonmovable in axial direction, said first and second thread means being in threaded engagement with each other, one of said thread means being turnable relative to said second support and connected to said second control means for turning movement therewith so that turning movement of said second control means effects axial movement of said objective, the thread means of said camera objective systems having different leads respectively related to the focal length of the respective objective for moving the objective of each camera objective system a different axial distance when said second control means is turned through the same angle for effecting focusing of each of said objectives for said selected different subject distances when said second control means is turned through said selected different angles; attaching means for detachably attaching said first support to the second support of one of said camera objective systems in a position in which said anamorphic lens system is optically aligned with the respective objective, said attaching means being adapted to detachably attach said first support to the second support of each of said camera objective systems; and coupling means detachably coupling the second control means of said one camera objective system to said first control means for simultaneous turning through said selected different angles, and being adapted to couple the second control means of each of said camera objective systems with said first control means when the second support of the respective camera objective system is attached to said first support.

3. An anamorphic adapter arrangement comprising, in combination, an anamorphic adapter including a first support, a first control means turnably mounted on said first support, and an anamorphic lens system including a movable lens member connected to said first control means and operated by the same so that turning of said first control means through selected different angles effects focusing of said anamorphic lens system for selected different subject distances; a plurality of camera objective systems, each camera objective system including a second support, a second control means mounted on said second support for turning movement and for movement in axial direction, an objective secured to said second control means for movement with the same, the objectives of said camera objective systems having different focal lengths, thread means on said second control means and on said second support in threaded engagement with each other so that turning movement of said second control means effects axial movement of said second control means and of said objective, the thread means of said camera objective systems having different leads respectively related to the focal length of the respective objective for moving the objective of each camera objective system a different axial distance for focusing the same when the respective second control means are turned through the same angle, and for effecting focusing of each of said objectives for said selected subject distances when said second control means is turned through said selected different angles; attaching means for detachably attaching said first support to the second support of one of said camera objective systems in a position in which said anamorphic lens system is optically aligned with the respective objective, said attaching means being adapted to detachably attach said first support to the second support of each of said camera objective systems; and coupling means detachably coupling the second control means of said one camera objective system to said first control means for simultaneous turning through said selected different angles, and being adapted to couple the second control means of each of said camera objective systems with said first control means when the second support of the respective camera objective system is attached to said first support.

4. An anamorphic adapter arrangement comprising, in combination, an anamorphic adapter including a first support, a first control means having a plurality of openings and being turnably mounted on said first support, and an anamorphic lens system including a movable lens member connected to said first control means and operated by the same so that turning of said first control means through selected different angles effects focusing of said anamorphic lens system for selected different subject distances; a plurality of camera objective systems, each camera objective system including a second support, a second control means turnably mounted on said second support, an objective movable in axial direction thereof, the objectives of said camera objective systems having different focal lengths, and transmission means driven from said second control means for moving said objective in axial direction, the transmission means of said camera objective systems having different ratios respectively related to the focal length of the respective objective for moving the objective of each camera objective system a different axial distance when said second control means is turned through the same angle for effecting focusing of each of said objectives for said selected different subject distances when said second control means is turned through said selected different angles; attaching means for detachably attaching said first support to the second support of one of said camera objective systems in a position in which said anamorphic lens system is optically aligned with the respective objective, said attaching means being adapted to detachably attach said first support to the second support of each of said camera objective systems; each camera objective system further including a plurality of coupling pins secured to said second control means, the coupling pins of said one camera objective system projecting into said openings in said first control means and detachably coupling the second control means of said one camera objective system to said first control means for simultaneous turning through said selected different angles, and being adapted to couple the second control means of each of said camera objective systems with said first control means when the second support of the respective camera objective system is attached to said first support.

5. An anamorphic adapter arrangement comprising, in combination, an anamorphic adapter including a first support, a first control means turnably mounted on said first support, and an anamorphic lens system including a movable lens member connected to said first control means and operated by the same so that turning of said first control means through selected different angles effects focusing of said anamorphic lens system for selected different subject distances; a plurality of camera objective systems, each camera objective system including a second support, a second control means turnably mounted on said second support, an objective movable in axial direction thereof, the objectives of said camera objective systems having different focal lengths, and transmission means driven from said second control means for moving said objective in axial direction, the transmission means of said camera objective systems having different ratios respectively related to the focal length of the respective objective for moving the objective of each camera objective system a different axial distance when said second control means is turned through the same angle for effecting focusing of each of said objectives for said selected different subject distances when said second control means is turned through said selected different angles; a turret means adapted to be mounted on a camera and supporting said second supports of said plurality of camera objective systems so that each of said camera objective systems can be successively placed in an operative position; attaching means for detachably attaching said first support to the second support of the camera objective system which is in said operative position in such a manner that said anamorphic lens system is optically aligned with the respective objective, said attaching means being adapted to attach said first support to the second support of any one of said camera objective systems in said operative position; and coupling means detachably coupling the second control means of said one camera objective system to said first control means for simultaneous turning through said selected different angles, and being adapted to couple the second control means of each of said camera objective systems with said first control means when the second support of the respective camera objective system is attached to said first support.

6. An anamorphic adapter arrangement comprising, in combination, an anamorphic adapter including a tubular housing, a first tubular support located within and being secured to said tubular housing, a first tubular control means located between said tubular housing and said first tubular support, and being turnably mounted on the same, said first tubular control means having an annular part having a plurality of openings, and an anamorphic lens system including a movable lens member connected to said first control means and operated by the same so that turning of said first control means through selected different angles effects focusing of said anamorphic lens system for selected different subject distances; a plurality of camera objective systems, each camera objective system including a second support, a second control means mounted on said second support for turning movement and for movement in axial direction, an objective secured to said second control means for movement with the same, the objectives of said camera objective systems having different focal lengths, thread means on said second control means and on said second support in threaded engagement with each other so that turning movement of said second control means effects axial movement of said second control means and of said objective, the thread means of said camera objective systems having different leads respectively related to the focal length of the respective objective for moving the objective of each camera objective system a different axial distance for focusing the same when the respective second control means are turned through the same angle, and for effecting focusing of each of said objectives for said selected subject distances when said second control means is turned through said selected different angles; a turrent means adapted to be mounted on a camera and supporting said second supports of said plurality of camera objective systems so that each of said camera objective systems can be successively placed in an operative position; attaching means for detachably attaching said housing to the second support of the camera objective system which is in said operative position in such a manner that said anamorphic lens system is optically aligned with the respective objective, said attaching means being adapted to attach said housing to the second support of any one of said camera objective systems in said operative position; each camera objective system including a plurality of coupling pins secured to said second control means, the coupling pins of said one camera objective system projecting into said openings in said annular part of said first tubular control means and sliding in said openings in axial direction during axial movement of said second control means, said coupling pins detachably coupling the second control means of said one camera objective system to said first control means for simultaneous turning through said selected different angles, and being adapted to couple the second control means of each of said camera objective systems with said first control means when the second support of the respective camera objective system is attached to said first support.

7. An anamorphic adapter arrangement comprising, in combination, an anamorphic adapter including a first support, a first control means mounted on said first support turnable and non-movable in axial direction, a lens mounting means non-turnably mounted on said first support for movement in axial direction, an anamorphic lens system including a front lens member and a rear lens member, one of said lens members being mounted in said lens mounting means for movement with the same in axial direction, and the other of said lens members being fixedly mounted in said first support, and first transmission means driven from said first control means and connected to said lens mounting means for moving said lens mounting means in axial direction for focusing said anamorphic lens system for selected different subject distances when said first control means is turned through selected different angles; a plurality of camera objective systems, each camera objective system including a second support, a second control means turnably mounted on said second support, an objective mounted on said second support for movement in axial direction, the objectives of said camera objective systems having different focal lengths, and second transmission means driven from said second control means for moving said objective in axial direction when said second control means is turned, the second transmission means of said camera objective systems having different ratios of transmission respectively related to the focal length of the respective objective for moving the objective of each camera objective system a different distance in axial direction when said second control means is turned through the same angle for effecting focusing of each of said objectives for said selected different subject distances when the respective second control means is turned through said selected different angles, the ratios of said first and second transmission means being interrelated so that turning of said first and second control means through said selected different angles effects focusing of said anamorphic lens system and of said objectives for said selected different subject distances; attaching means for detachably attaching said first support to the second support of one of said camera objective systems in a position in which said anamorphic lens system is optically aligned with the respective objective, said attaching means being adapted to detachably attach said first support to the second support of each of said camera objective systems; and coupling means detachably coupling the second control means of said one camera objective system to said first control means for simultaneous turning movement through said predetermined angles, and being adapted to couple the second control means of each of said camera objective systems with said first control means when the second support of the respective camera objective system is attached to said first support.

8. An anamorphic adapter arrangement comprising, in combination, an anamorphic adapter including a first support, a first control means mounted on said first support turnable and non-movable in axial direction, a lens mounting means non-turnably mounted on said first support for movement in axial direction, an anamorphic lens system including a front lens member and a rear lens member, one of said lens members being mounted in said lens mounting means for movement with the same in axial direction, and the other of said lens members being fixedly mounted in said first support, and transmission means driven from said first control means and connected to said lens mounting means for moving said lens mounting means in axial direction for focusing said anamorphic lens system for selected different subject distances when said first control means is turned through selected different angles; a plurality of camera objective systems, each camera objective system including a second support, a second control means turnably mounted on said second support, an objective mounted on said second support for movement in axial direction, the objectives of said camera objective systems having different focal lengths, first thread means fixedly secured to said objective and second thread means secured to said second support non-movable in axial direction, said first and second thread means being in threaded engagement with each other, one of said thread means being turnable relative to said second support and connected to said second control means for turning movement therewith so that turning movement of said second control means effects axial movement of said objective, the thread means of said camera objective systems having different leads respectively related to the focal length of the respective objective for moving the objective of each camera objective system a different axial distance for focusing the same when the respective second control means is turned through the same angle, said different leads being related to the ratio of said transmission means for effecting focusing of each of said objectives for said selected different subject distances when said second control means is turned through said selected different angles; attaching means for detachably attaching said first support to the second support of one of said camera objective systems in a position in which said anamorphic lens system is optically aligned with the respective objective, said attaching means being adapted to detachably attach said first support to the second support of each of said camera objective systems; and coupling means detachably coupling the second control means of said one camera objective system to said first control means for simultaneous turning movement through said predetermined angles, and being adapted to couple the second control means of each of said camera objective systems with said first control means when the second support of the respective camera objective system is attached to said first support.

9. An anamorphic adapter arrangement comprising, in combination, an anamorphic adapter including a first tubular support, said first tubular support having at least one axially extending guide slot, a first tubular control means mounted on said first support turnable and non-movable in axial direction, said first tubular control means being formed with a helical guide means on the inner surface thereof, a lens mounting means supported within said first tubular support for movement in axial direction, a pin means secured to said lens mounting means passing through said guide slot of said first tubular support and being slidable along said helical guide means on the inner surface of said first tubular control means so that turning of said first tubular control means moves said lens mounting means in axial direction, and an anamorphic lens system including a front lens member and a rear lens member, one of said lens members being mounted in said lens mounting means for movement with the same in axial direction, and the other of said lens members being fixedly mounted in said first tubular support, said helical guide means and said pin means constituting a first transmission means so that turning of said first tubular control means through selected different angles effects axial movement of said one lens member for focusing said anamorphic lens system for selected different subject distances; a plurality of camera objective systems, each camera objective system including a second support, a second control means turnably mounted on said second support, an objective mounted on said second support for movement in axial direction, the objectives of said camera objective systems having different focal lengths, and second transmission means driven from said second control means for moving said objective in axial direction when said second control means is turned, the second transmission means of said camera objective systems having different ratios of transmission respectively related to the focal length of the respective objective for moving the objective of each camera objective system a different distance in axial direction when said second control means is turned through the same angle for effecting focusing of each of said objectives for said selected different subject distances when the respective second control means is turned through said selected different angles, the ratios of said first and second transmission means being interrelated so that turning of said first and second control means through said selected different angles effects focusing of said anamorphic lens system and of said objectives for said selected different subject distances; attaching means for detachably attaching said first support to the second support of one of said camera objective systems in a position in which said anamorphic lens system is optically aligned with the respective objective, said attaching means being adapted to detachably attach said first support to the second support of each of said camera objective systems; and coupling means detachably coupling the second control means of said one camera objective system to said first control means for simultaneous turning movement through said predetermined angles, and being adapted to couple the second control means of each of said camera objective systems with said first control means when the second support of the respective camera objective system is attached to said first support.

10. An anamorphic adapter arrangement comprising, in combination, an anamorphic adapter including a first tubular support, said first tubular support having at least one axially extending guide slot, a first tubular control means mounted on said first support turnable and non-movable in axial direction, said first tubular control means being formed with a helical guide means on the inner surface thereof, a lens mounting means supported within said first tubular support for movement in axial direction, a pin means secured to said lens mounting means passing through said guide slot of said first tubular support and being slidable along said helical guide means on the inner surface of said first tubular control means so that turning of said first tubular control means moves said lens mounting means in axial direction, and an anamorphic lens system including a front lens member and a rear lens member, one of said lens members being mounted in said lens mounting means for movement with the same in axial direction, and the other of said lens members being fixedly mounted in said first tubular support, so that turning of said first tubular control means through selected different angles effects axial movement of said one lens member for focusing said anamorphic lens system for selected different subject distances; a plurality of camera objective systems, each camera objective system including a second support, a second control means turnably mounted on said second support, an objective mounted on said second support for movement in axial direction, the objectives of said camera objective systems having different focal lengths, first thread means fixedly secured to said objective and second thread means secured to said second support non-movable in axial direction, said first and second thread means being in threaded engagement with each other, one of said thread means being turnable relative to said second support and connected to said second control means for turning movement therewith so that turning movement of said second control means effects axial movement of said objective, the thread means of said camera objective systems having different leads respectively related to the focal length of the respective objective for moving the objective of each camera objective system a different distance for focusing the same when the respective second control means is turned through the same angle, the respective leads of said thread means of said camera objective systems being interrelated with the lead of said helical guide means so that each of said objectives is focused for said selected different subject distances when said second control means are turned through said selected different angles; attaching means for detachably attaching said first support to the second support of one of said camera objective systems in a position in which said anamorphic lens system is optically aligned with the respective objective, said attaching means being adapted to detachably attach said first support to the second support of each of said camera objective systems; and coupling means detachably coupling the second control means of said one camera objective system to said first control means for simultaneous turning movement through said predetermined angles, and being adapted to couple the second control means of each of said camera objective systems with said first control means when the second support of the respective camera objective system is attached to said first support, said coupling means including a first coupling element on said first control means and a second coupling element on said second control means of each of said camera objective systems.

11. An anamorphic adapter arrangement comprising, in combination, an anamorphic adapter including a tubular housing, a first tubular support located within and being secured to said tubular housing, said first tubular support having at least one axially extending guide slot, a first tubular control means located between said tubular housing and said first tubular support, said first tubular control means being mounted on said housing and on said first tubular support turnable and non-movable in axial direction, said first tubular control means being formed with a helical guide means on the inner surface thereof, a lens mounting means supported within said first tubular support for movement in axial direction, a pin means secured to said lens mounting means passing through said guide slot of said first tubular support and being slidable along said helical guide means on the inner surface of said first tubular control means so that turning of said first tubular control means moves said lens mounting means in axial direction, and an anamorphic lens system including a front lens member and a rear lens member, one of said lens members being mounted in said lens mounting means for movement with the same in axial direction, and the other of said lens members being fixedly mounted in said first tubular support, so that turning of said first tubular control means through selected different angles effects axial movement of said one lens member for focusing said anamorphic lens system for selected different subject distances; a plurality of camera objective systems, each camera objective system including a second support, a second annular control means mounted on said second support for turning movement and for movement in axial direction, an objective located within and secured to said annular second control means for movement with the same, the objectives of said camera objective systems having different focal lengths, thread means on said second annular control means and on said second support in threaded engagement with each other so that turning movement of said second annular control means effects axial movement of said second annular control means and of said objective, the thread means of each of said camera objective systems having different leads respectively related to the focal length of the respective objective for moving the objective of each camera objective system a different axial distance for effecting focusing of each of said objectives when the respective second annular control means is turned through the same angle, the respective leads of the thread means of said camera objective systems being interrelated with the lead of said helical guide means on said first tubular control means so that each of said objectives is focused for said selected different subject distances when said second control means are turned through said selected different angles; a turret means adapted to be mounted on a camera and supporting said second supports of said plurality of camera objective systems so that each of said camera objective systems can be successively placed in an operative position; attaching means for detachably attaching said housing to the second support of the camera objective system which is in said operative position in such a manner that said anamorphic lens system is optically aligned with the respective objective, said attaching means being adapted to attach said housing to the second support of any one of said camera objective systems in said operative position; and coupling means detachably coupling the second control means of said one camera objective system to said first control means for simultaneous turning movement through said predetermined angles, and being adapted to couple the second control means of each of said camera objective systems with said first control means when the second support of the respective camera objective system is attached to said first support, said coupling means including a first coupling element on said first control means and a second coupling element on said second control means of each of said camera objective systems.

12. An anamorphic adapter arrangement comprising, in combination, an anamorphic adapter including a tubular housing, a first tubular support located within and being secured to said tubular housing, a first tubular control means located between said tubular housing and said first tubular support, and being turnably mounted on the same, said first tubular control means including a floating ring having radial slots and surrounding a portion of said first tubular control means and means connecting said surrounded portion of said first tubular control means with said ring to permit movement of said ring, and an anamorphic lens system including a movable lens member connected to said first control means and operated by the same so that turning of said first control means through selected different angles effects focusing of said anamorphic lens system for selected different subject distances; a plurality of camera objective systems, each camera objective system including a second support, a second control means mounted on said second support for turning movement and for movement in axial direction, an objective secured to said second control means for movement with the same, the objectives of said camera objective systems having different focal lengths, thread means on said second control means and on said second support in threaded engagement with each other so that turning movement of said second control means effects axial movement of said second control means and of said objective, the thread means of said camera objective systems having different leads respectively related to the focal length of the respective objective for moving the objective of each camera objective system a different axial distance for focusing the same when the respective second control means are turned through the same angle, and for effecting focusing of each of said objectives for said selected subject distances when said second control means is turned through said selected different angles; attaching means for detachably attaching said housing to the second support of one of said camera objective systems in a position in which said anamorphic lens system is optically aligned with the respective objective, said attaching means being adapted to detachably attach said housing to the second support of each of said camera objective systems; each camera objective system including a plurality of coupling pins secured to said second control means, the coupling pins of said one camera objective system projecting into said radial slots in said floating ring of said first tubular control means and sliding in said slots in axial direction during axial movement of said second control means while movements of said floating ring prevent binding of said coupling pins in said slots of said floating ring, said coupling pins detachably coupling the second control means of said one camera objective system to said first control means for simultaneous turning through said selected different angles, and being adapted to couple the second control means of each of said camera objective systems with said first control means when the second support of the respective camera objective system is attached to said first support.

References Cited in the file of this patent

UNITED STATES PATENTS

| | | |
|---|---|---|
| 2,184,018 | Ort | Dec. 19, 1939 |
| 2,263,024 | Wood | Nov. 18, 1941 |
| 2,529,894 | Altman et al. | Nov. 14, 1950 |
| 2,566,889 | Hopkins | Sept. 4, 1951 |
| 2,811,080 | Harter et al. | Oct. 29, 1957 |
| 2,818,768 | Updegraff | Jan. 7, 1958 |
| 2,865,274 | Richartz | Dec. 23, 1958 |